US012781922B2

(12) United States Patent
Pennec et al.

(10) Patent No.: US 12,781,922 B2
(45) Date of Patent: Nov. 3, 2026

(54) DEVICE FOR SUPPLYING CRYOGENIC FLUID AND INSTALLATION FOR FILLING TANKS

(71) Applicant: L'Air Liquide, Societe Anonyme pour l'Etude et l'Exploitation des Procedes Georges Claude, Paris (FR)

(72) Inventors: Yan Pennec, Sassenage (FR); Cyril Benistand-Hector, Sassenage (FR); Loic Brunet Manquat, Sassenage (FR); Wassim Ouakrim, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 239 days.

(21) Appl. No.: 18/645,739

(22) Filed: Apr. 25, 2024

(65) Prior Publication Data

US 2024/0360957 A1 Oct. 31, 2024

(30) Foreign Application Priority Data

Apr. 25, 2023 (FR) ....................................... 2304147

(51) Int. Cl.
*F17C 5/02* (2006.01)
*F17C 13/00* (2006.01)
(Continued)

(52) U.S. Cl.
CPC .............. *F17C 5/02* (2013.01); *F17C 13/001* (2013.01); *F17C 13/04* (2013.01); *F17C 13/06* (2013.01);
(Continued)

(58) Field of Classification Search
CPC ........ F17C 13/001; F17C 13/04; F17C 13/06; F17C 2201/0147; F17C 2201/052;
(Continued)

(56) References Cited

U.S. PATENT DOCUMENTS 4,472,946 A 9/1984 Zwick
4,593,835 A * 6/1986 Kikkawa .................. F04D 7/02
222/131

(Continued)

OTHER PUBLICATIONS

French Search Report for FR 2 304 147, mailed Oct. 26, 2023.

*Primary Examiner* — Filip Zec
(74) *Attorney, Agent, or Firm* — Allen E. White; Elwood L. Haynes

(57) ABSTRACT

The invention relates to a device for supplying pressurized cryogenic fluid having a thermally insulated container consisting of an inner tank for cryogenic liquid to be pumped, for example hydrogen, and an outer tank delimiting a sealed volume about the inner tank, the inner tank and the outer tank extending vertically and being closed at the top end thereof by a set of covers, the device having a pumping system mounted on the set of covers and having a lower end seated in the inner tank to pump the cryogenic liquid therein, the device also having a cryogenic liquid feed circuit to supply the inner tank and a delivery circuit to transfer the cryogenic liquid pumped by the pumping system out of the inner tank, the pumping system having at least one piston pump actuated by an actuator, preferably a linear actuator.

19 Claims, 3 Drawing Sheets

(51) Int. Cl.
*F17C 13/04* (2006.01)
*F17C 13/06* (2006.01)

(52) U.S. Cl.
CPC *F17C 2221/012* (2013.01); *F17C 2223/0161* (2013.01); *F17C 2225/0161* (2013.01); *F17C 2227/0142* (2013.01); *F17C 2227/044* (2013.01)

(58) Field of Classification Search
CPC ............ F17C 2201/054; F17C 2203/03; F17C 2203/032; F17C 2203/0387; F17C 2203/0629; F17C 2205/0332; F17C 2205/0335; F17C 2221/012; F17C 2223/0161; F17C 2223/033; F17C 2225/0161; F17C 2225/033; F17C 2227/0142; F17C 2227/0178; F17C 2227/0185; F17C 2227/044; F17C 2250/032; F17C 2250/0408; F17C 2250/043; F17C 2250/0439; F17C 5/02; F17C 7/02
See application file for complete search history.

(56) References Cited

U.S. PATENT DOCUMENTS

| | | | | |
|---|---|---|---|---|
| 6,354,088 | B1 | 3/2002 | Emmer et al. | |
| 7,069,730 | B2 | 7/2006 | Emmer et al. | |
| 7,219,682 | B2 * | 5/2007 | Agnew | F17C 13/084 137/263 |
| 8,291,944 | B2 * | 10/2012 | Allidieres | F17C 13/025 62/50.7 |
| 9,435,323 | B2 * | 9/2016 | Jung | F04D 7/02 |
| 9,562,533 | B2 * | 2/2017 | Johchi | F04D 13/08 |
| 9,869,429 | B2 * | 1/2018 | Drube | F17C 7/02 |
| 9,903,535 | B2 * | 2/2018 | Snyder | F17C 7/04 |
| 10,077,871 | B2 * | 9/2018 | Blanchet | F17C 5/06 |
| 10,823,334 | B2 * | 11/2020 | Wang | B67D 7/36 |
| 10,921,037 | B1 * | 2/2021 | Ellis | F25D 3/10 |
| 11,326,741 | B2 * | 5/2022 | McDonald | F02M 21/0221 |
| 11,384,883 | B2 * | 7/2022 | Stautner | F16L 59/18 |
| 11,415,084 | B2 * | 8/2022 | Bartlok | F17C 7/04 |
| 12,129,972 | B2 * | 10/2024 | Petitpas | F17C 7/04 |
| 12,405,594 | B2 * | 9/2025 | Light | F17C 13/025 |
| 2005/0006392 | A1 * | 1/2005 | Yuan | F17C 13/083 220/560.12 |
| 2005/0132719 | A1 * | 6/2005 | Svensson | F17C 5/06 141/82 |
| 2010/0241371 | A1 * | 9/2010 | Ammouri | F17C 5/02 703/2 |
| 2012/0159970 | A1 * | 6/2012 | Reese | F17C 5/007 62/53.2 |
| 2016/0061384 | A1 * | 3/2016 | Caldwell | F04D 9/003 62/50.6 |
| 2016/0215930 | A1 * | 7/2016 | Nelson | B63B 25/16 |
| 2018/0112829 | A1 * | 4/2018 | Popadiuc | F17C 13/083 |
| 2019/0323660 | A1 * | 10/2019 | Brothers | F17C 3/08 |
| 2020/0040881 | A1 * | 2/2020 | Yoshimoto | F04D 7/02 |
| 2020/0182408 | A1 * | 6/2020 | Nagura | B67D 7/80 |
| 2021/0404604 | A1 | 12/2021 | Drube et al. | |
| 2024/0353066 | A1 * | 10/2024 | Sane | F17C 5/02 |

* cited by examiner

[Fig. 1]
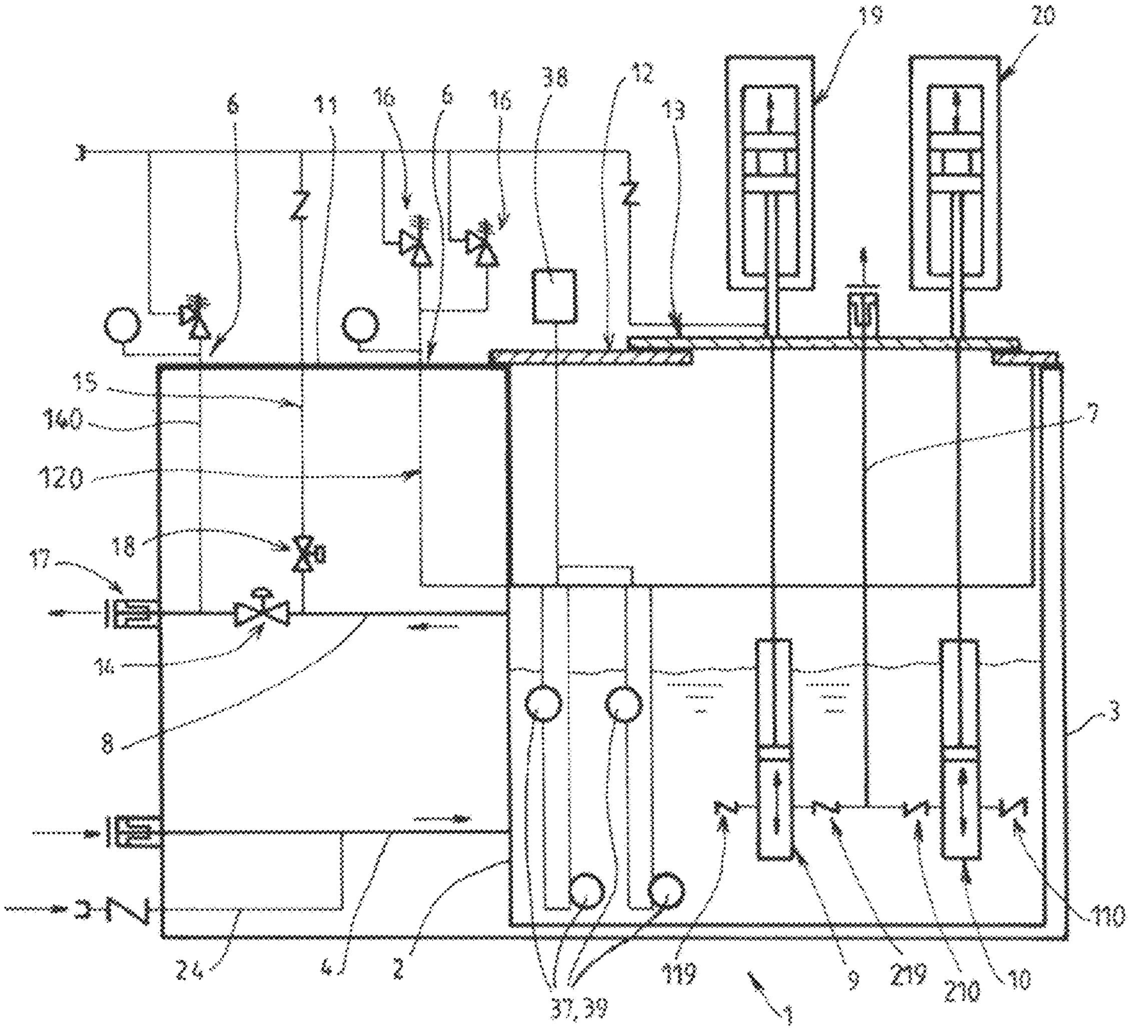

[Fig. 2]
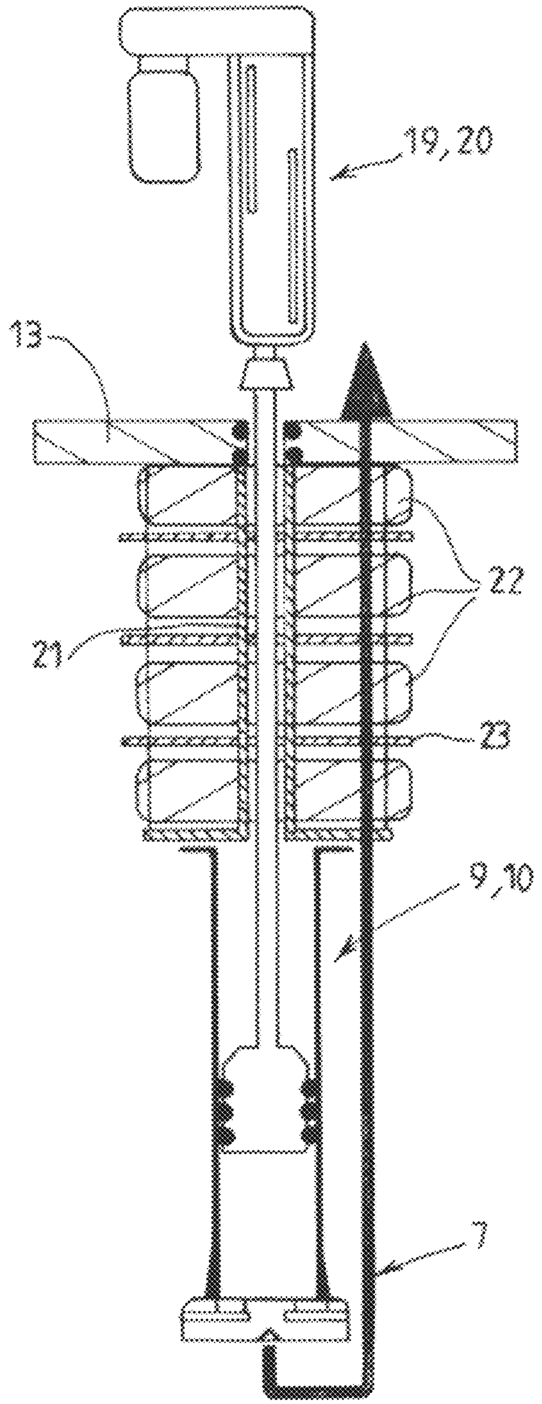

[Fig. 3]
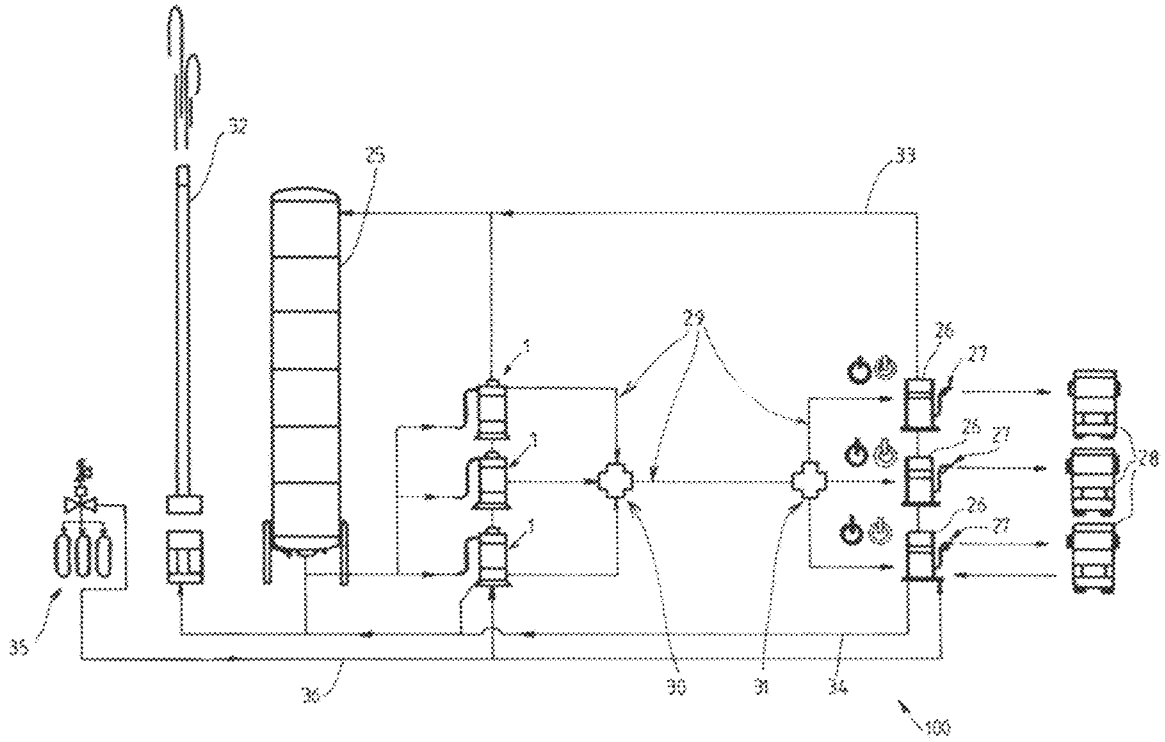
[Fig. 4]
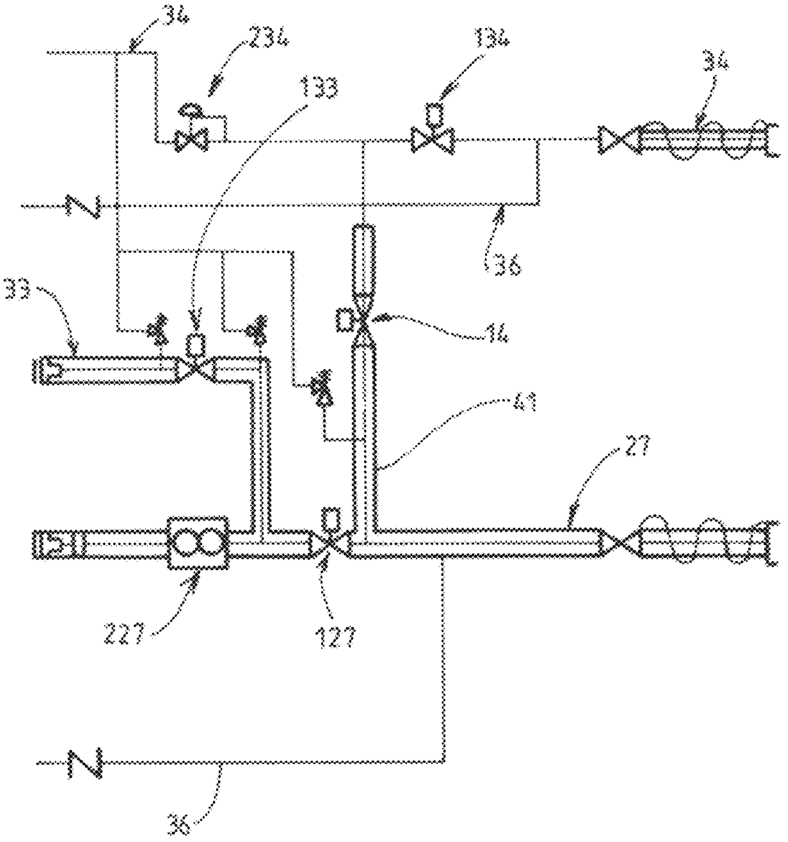

DEVICE FOR SUPPLYING CRYOGENIC FLUID AND INSTALLATION FOR FILLING TANKS

CROSS-REFERENCE TO RELATED APPLICATIONS

This application claims the benefit of priority under 35 U.S.C. § 119 (a) and (b) to French patent application No. FR 2 304 147, filed Apr. 25, 2023, the entire contents of which are incorporated herein by reference.

BACKGROUND

The invention relates to a device for supplying cryogenic fluid and an installation for filling tanks.

FIELD OF THE INVENTION

The invention relates more specifically to a device for supplying pressurized cryogenic fluid comprising a thermally insulated container consisting of an inner tank delimiting a volume designed to store cryogenic liquid to be pumped, for example liquid hydrogen, and an outer tank arranged about the inner tank and delimiting a sealed volume about the inner tank, when the device is in the usage state, the inner and outer tanks extending vertically and being closed at the top end thereof by a set of covers, the device comprising a pumping system mounted on the set of covers and comprising a lower end seated in the volume delimited by the inner tank and designed to pump the cryogenic liquid therein, the device further comprising a cryogenic liquid feed circuit designed to supply the inner tank with cryogenic fluid and a delivery circuit designed to transfer the cryogenic liquid pumped by the pumping system out of the inner tank.

RELATED ART

Projects for supplying vehicles with this pressurized liquid hydrogen pose challenges in terms of achieving expected performance levels relating to temperature, pressure and flow rate.

Existing solutions involve pumping the liquid hydrogen in industrial supply applications (liquid transfer) or pumping the liquid hydrogen that is then vaporized at very high pressure.

SUMMARY OF THE INVENTION

One aim of the present invention is to overcome all or some of the aforementioned drawbacks of the prior art.

To this end, the device according to the invention, in other respects in accordance with the generic definition thereof given in the above preamble, is essentially characterized in that the pumping system comprises at least one piston pump actuated by an actuator, preferably a linear actuator.

Furthermore, embodiments of the invention may include one or more of the following features:

- the pumping system comprises two piston pumps connected in parallel to the delivery circuit and designed to be actuated in an offset manner to ensure a continuous flow of cryogenic liquid pumped through the delivery circuit,
- the set of covers comprises a first cover and a second cover, the second cover closing an opening in the first cover, the second cover forming a support for the pumping system and being mounted sealingly and removably on the second cover, the pumping system being designed to be mounted or removed vertically in relation to the container when the second cover is mounted or removed,
- the delivery circuit comprises a delivery line having a lower end connected to the lower end of the pumping system and an upper end connected to the set of covers, when the device is in the usage state, a part of the delivery line being immersed in the cryogenic liquid to be pumped,
- the upper end of the delivery line is connected to the second cover and opens in the latter,
- the cryogenic liquid feed circuit comprises a set of valves and passes through the sealed volume delimited about the inner tank by the outer tank,
- the set of covers comprises at least one degassing outlet passage connected to a set of degassing lines passing through the sealed volume delimited about the inner tank by the outer tank,
- the set of degassing lines comprises a first degassing line having a first end connected to an upper end of the inner tank and a second end leading to a coupling outside the container,
- the first degassing line comprises a valve,
- the set of degassing lines comprises at least one second degassing line having a first end connected to the first degassing line and a second end leading to a coupling or passage outside the container,
- the device includes at least one second degassing line provided with a valve and/or connected to a pressure-sensitive safety valve located outside the container,
- the pumping system comprises a piston rod that extends vertically in the inner tank, the device comprising a support and guidance structure for the pumping system mounted about the piston rod inside the inner tank, the device further comprising a thermal insulation structure interposed about the support and guidance structure,
- the thermal insulation structure is rigidly connected to the second cover between the second cover and a lower end of the support and guidance structure,
- the thermal insulation structure comprises a vertical stack of a set of insulating foam layers and/or a set of thermal shields,
- the device comprises a purge circuit comprising at least one line having a first end leading to a coupling or passage outside the container and a second end connected to the feed circuit,
- the inner tank has a system for monitoring and regulating the liquid level comprising at least one of the following: a pressure sensor measuring the pressure in the inner tank, a temperature sensor measuring the temperature in the inner tank, and a liquid level sensor measuring the liquid level in the inner tank,
- the set of valves and members for measuring and treating the pumped fluid flow is seated in the sealed volume delimited about the inner tank by the outer tank.

The invention also relates to an installation for filling tanks with pressurized cryogenic fluid, in particular liquefied hydrogen, comprising at least one fluid supply device according to any one of the features above or below, wherein the cryogenic liquid feed circuit is designed to be connected to at least one source of liquefied cryogenic fluid, the installation comprising at least one pressurized cryogenic fluid distributor provided with a transfer line having one end designed to be connected to a tank to be filled, the installation comprising a distribution circuit connecting the delivery circuit of at least one fluid supply device to at least one fluid distributor.

According to other possible distinguishing features:

- the installation comprises several fluid supply devices connected in parallel to one or more fluid distributors via the distribution circuit, the distribution circuit comprising a common distribution line and a set of distribution valves designed to enable the selective transfer of fluid from one or more fluid supply devices to the fluid distributor or distributors,
- the installation comprises at least one source of cryogenic liquid connected to the cryogenic liquid feed circuit of at least one fluid supply device,
- the fluid distributor comprises a pressurized gas recovery circuit connected to the transfer line and a gas recovery member, for example the source of cryogenic liquid,
- the fluid distributor comprises a gas recovery circuit having one end connected to the transfer line and one end connected to a gas recovery member, for example the source of cryogenic liquid and/or connected to the flue,
- the installation comprises a reserve of flushing gas, for example nitrogen, and a purge network connecting the reserve of flushing gas to the transfer line of the fluid distributor and to the supply device or devices.

The invention can also relate to any alternative device or method comprising any combination of the features above or below within the scope of the claims.

Further distinctive features and advantages will become apparent on reading the description below, provided with reference to the figures, in which:

BRIEF DESCRIPTION OF THE FIGURES

The invention will be better understood upon reading the following description, which is given solely by way of example and with reference to the appended drawings, in which:

FIG. 1 is a schematic partial vertical cross-section view of an example cryogenic fluid supply device according to an example embodiment of the invention, FIG. 2 is a schematic partial vertical cross-section view of a detail of a pumping system of the cryogenic fluid supply device according to an example embodiment of the invention, FIG. 3 is a schematic partial view of an example installation for filling tanks using such a cryogenic fluid supply device, FIG. 4 is a schematic partial view of an example fluid distributor of such a filling installation.

DETAILED DESCRIPTION OF THE INVENTION

Throughout the figures, the same reference signs relate to the same elements.

In this detailed description, the following embodiments are examples. Although the description refers to one or more embodiments, this does not mean that the features apply only to a single embodiment. Individual features of different embodiments may also be combined and/or interchanged in order to provide other embodiments.

The pressurized cryogenic fluid supply device 1 comprises a thermally insulated container consisting of an inner cryogenic tank 2 delimiting a volume designed to store cryogenic liquid to be pumped, for example liquid hydrogen. The container further comprises an outer tank 3 arranged about the inner tank 2, delimiting a sealed volume about the inner tank 2 (preferably a volume under vacuum). The inner tank 2 is for example seated in the volume of the outer tank 3.

When the device 1 is in the usage state, the inner tank 2 and the outer tank 3 extend vertically from respective lower bases and are closed at the top ends thereof by a set of common covers 11, 12, 13.

The outer tank 3 is for example closed by a main cover 11 (for example by welding). This main cover 11 has an opening to enable the passage of the inner tank 2, and this opening is closed sealingly by another intermediate cover 12, which closes the inner tank 2. The intermediate cover 12 is for example fastened by welding to the main cover 11. Finally, the device 1 may have a third support cover 13 mounted on the intermediate cover 12 to sealingly close a passage in the intermediate cover 12. This support cover 13 may be mounted sealingly and removably on the intermediate cover 12 and may act as support for a pumping system of the device 1, as described in greater detail below.

The pumping system 9, 10 mounted on the set of covers has a lower end seated in the volume delimited by the inner tank 2 and designed to pump the cryogenic liquid therein and an upper end located above the set of covers (outside the container) comprising the hot actuation system (motor or motors).

The device 1 comprises a cryogenic liquid feed circuit 4 designed to supply the inner tank 2 with cryogenic fluid (supplied by a source). The device 1 further comprises a delivery circuit 7 designed to transfer the cryogenic liquid pumped by the pumping system 9, 10 out of the inner tank 2.

The pumping system comprises at least one piston pump 9, 10 actuated by at least one actuator 19, preferably a linear actuator. As illustrated, the pumping system preferably comprises two piston pumps connected in parallel to the delivery circuit 7 and designed to be actuated in an offset manner and alternately to ensure a continuous flow of cryogenic liquid pumped through the delivery circuit 7. This means that the two alternating pumps 9, 10 are used in parallel and alternately, forming a single compression stage delivering a continuous flow at constant pressure. This enables the provision of controlled mass flow rate profiles.

This alternating offset usage of two pumps enables a constant or near-constant flow rate to be supplied.

Each piston can be driven by a respective linear motor 19, 20 or a respective actuator. This provides precise control of the position and direction of the piston. This for example enables an average travel of 5 cm to 50 cm, a moderate frequency in the order of 0.1 Hz to 5 Hz, and moderate forces of 2 kN to 20 kN. Linear motor drive enables a non-sinusoidal cycle such as a square profile for a constant mass flow rate or low-speed operation during the intake phase and high-speed operation during the compression phase.

The arrangement has two separate heads operating with a phase shift of 180°.

Each piston pump for example comprises a piston that is mounted at the end of a shaft and that slides in a reciprocal motion in a cylinder to execute the compression and intake phases in a compression chamber. Each piston is preferably movable in translation in a single-body cylinder. This limits the cost of parts and assembly. The piston head is preferably screwed to the rod to be easily replaceable.

Each lower pumping end may include a respective intake valve 119, 110 and a respective delivery valve 219, 210.

The intake valves 119, 110 and the delivery valves 219, 210 may be arranged relatively to optimize the pressure drop on injection into the compression chamber, to limit the generation of flash gas on injection, thereby optimizing the volumetric efficiency of the pump. For example, each pump comprises a set of slots in the shaft and/or the piston that are designed to discharge gas when the piston is moving.

The delivery circuit 7 comprises a delivery line having a lower end connected to the lower end of the pumping system 9, 10 and an upper end connected to the support cover 13. The delivery valves 219, 210 are for example connected in parallel to a lower end of the delivery line.

The delivery line extends upwards and, when the device 1 is in the usage state, a part of this delivery line is immersed in the cryogenic liquid to be pumped. This layout ensures a heat exchange with the reserve of cold liquid to be pumped, keeping the pumped fluid cold before it is discharged from the container. This keeps the exhaust temperature under cryogenic conditions.

As illustrated in [FIG. 2], each pump 9, 10 may comprise a piston rod 42 that extends vertically in the inner tank 2 and a support and guidance structure 21 for the assembly of the rod 42 and the piston 43. This support and guidance structure 21 is mounted about the piston rod 42 inside the inner tank 2. The support and guidance structure 21 for example comprises a tubular guide provided with shoulders at the ends thereof.

Furthermore, the device 1 preferably comprises a thermal insulation structure 22, 23 interposed about the support and guidance structure 21.

This thermal insulation structure 22, 23 is for example rigidly connected to the support cover 13 between this cover 13 and a lower end of the support and guidance structure 21. The thermal insulation structure for example comprises a vertical stack of a set of thermally insulating foam layers 22 and/or a set of thermalized thermal shields 23 (for example cooled by the cryogenic fluid from the inner tank 2). In a variant or in combination, the thermal insulation structure may include an additional separation space under vacuum.

This enables the pumping system to be simply lifted vertically with the support cover 13 thereof for maintenance, providing direct and rapid access to the repairable parts. Specifically, at least one of the delivery valves 219, 210, the intake valves 119, 110, the delivery line, the support and guidance structure 21, and the thermal insulation structure 22, 23 may be rigidly connected to the support cover 13. Lifting the latter provides direct access to the repairable parts of the pumping portion.

The volume of liquid immersing the pumping ends is insulated under vacuum by the volume of the outer tank 3, which incorporates the circuitry (notably valves and fluidic coupling). Thus, the cryogenic liquid feed circuit 4 may comprise a set of valves 14 and may pass through the sealed volume delimited about the inner tank 2 by the outer tank 3.

The set of covers comprises at least one degassing outlet passage 6 connected to a set of degassing lines 8, 120, 140, 15 passing through the sealed volume delimited about the inner tank 2 by the outer tank 3. For example, a first degassing line 8 may extend between a first end connected to an upper end of the inner tank 2 and a second end leading to a coupling 17 outside the container. The first degassing line 8 for example comprises a degassing valve 14. As illustrated, the set of degassing lines may comprise at least one second degassing line 120, 140, 15 having a first end connected to the first degassing line 8 and a second end leading to a coupling or passage outside the container. Preferably, at least one degassing line 15 is provided with a valve 18 and/or connected to a pressure-sensitive safety valve 16 located outside the container (the discharged gas passing through a cover 11). A redundant safety overpressure valve 16 is preferably provided for the inner tank 2. Furthermore, a thermal-expansion protection valve is preferably also provided for each circuit node.

In an advantageous embodiment illustrated, the cryogenic liquid feed circuit 4 has no valve in the outer tank 3, but may have just one self-closing valve 40 at a coupling opening in the outer wall of the outer tank 3.

As illustrated, the device 1 preferably comprises a purge circuit 24 comprising at least one line having a first end leading to a coupling or passage outside the container and a second end connected to the feed circuit 4.

This simplified structure can therefore use just two valves 14, 18, one valve 14 on the degassing line 8 to control the pressure level in the inner tank 2 and one valve 18 on another degassing line 15 for the forced discharge via the vent 16 and/or for an inerting and conditioning procedure for the circuitry.

The volume of the outer tank 3 thus forms a valve box.

As illustrated, the inner tank 2 preferably has a system 38 for monitoring and regulating the level of liquid in the inner tank 2. This monitoring and regulating system 38 may for example comprise at least one of the following: a pressure sensor measuring the pressure in the inner tank 2, a temperature sensor 37 measuring the temperature in the inner tank 2, and a liquid level sensor 39 measuring the liquid level in the inner tank 2. The measurements taken by the sensor or sensors may be processed by an electronic member 38 comprising a microprocessor, for example to enable automatic filling of the inner tank 2.

One or more pressurized cryogenic fluid supply devices 1 may be used in tank filling stations.

FIG. 3 illustrates an installation 100 for filling tanks with pressurized cryogenic fluid, in particular liquefied hydrogen, comprising three fluid supply devices 1.

The circuit 4 of the fluid supply devices 1 is connected to at least one source 25 of liquefied cryogenic fluid (in this case a cryogenic liquid storage facility). A source formed by a static tank enables recovery of a significant quantity of the boil-off gas generated by the pumping system or any other part of the installation 100. Naturally, in a variant this source 2 may also comprise or include a mobile delivery tank.

The installation 100 comprises three pressurized cryogenic fluid distributors 26, each provided with a transfer line 27 having one end designed to be connected to a tank 28 to be filled (quick coupling). The installation 100 comprises a distribution circuit 29 connecting the delivery circuit 7 of the fluid supply device 1 to the distributors 26. In this example, the fluid supply devices 1 are connected in parallel to the fluid distributors 26 via the cryogenic distribution circuit 29. This distribution circuit 29 may comprise a single common distribution line and a set of distribution valves 30, 31 designed to enable the selective transfer of fluid from one or more fluid supply devices 1 to the fluid distributor or distributors 27. The set of distribution valves 30, 31 may include one or more three-way valves and/or several two-way valves arranged to enable any one of the supply devices to distribute the fluid to any one of the distributors 26.

The installation 100 may include a gas discharge flue 32 connected to the set of degassing lines 8, 120, 140, 15 of the fluid supply devices 1.

Each distributor 26 comprises a liquid transfer line 27, the downstream end of which may include a hose provided with a quick coupling designed to be connected to a tank to be filled. A support arm for the hose may be provided to reduce the perceived mass and the translational forces for the flexible cryogenic lines and a connecting pipe where necessary. A heater may be mounted at the base of the pipe system of the distributor 26 to de-ice and remove dust from the nozzle before/after use.

As illustrated, the transfer line 27 may include an insulation valve 127 and optionally a flowmeter 227.

Similarly, each fluid distributor 26 may comprise a pressurized gas recovery circuit 33 connected to the transfer line 27 and a gas recovery member, for example to the source 25 of cryogenic liquid.

The distributor 26 may include a first gas recovery line 34 having an upstream end located at a hose and intended to be connected to the tank to be filled (to depressurize same). A second downstream end of this first gas recovery line 34 is for example intended to be connected to the source or any other gas collection system (flash gas). Between these upstream and downstream ends, the gas recovery line 34 may include a valve 134 and/or an expansion device 234.

A second gas recovery line 33 joined to a valve 133 may be connected to the transfer line 27.

A transverse line 41 (fitted with a valve 141) may be provided to connect the transfer line 27 and the first gas recovery line 34.

One or more purge lines may be connected to the gas recovery line 34 and/or the transfer line 27 to feed and recover a flow of purge gas during a purge/flushing operation of the circuits. This flushing gas, for example nitrogen, may be provided by a reserve 35 of flushing gas in the installation 100. This purge gas may also preferably supply the circuits of the fluid transfer devices 1 via a purge network 36.

This conditioning and inerting system enables appropriate quantities of gas (N2, H2, He) to be delivered to specific locations in the circuits.

The parallel arrangement of the distribution devices 1 and the distributors 26 in particular enables the separate maintenance thereof without having to stop the whole installation 100.

Some or all of the valves and/or members may be controlled by an electronic control member comprising a microprocessor and communicating with the installation 100.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An installation for filling tanks with pressurized cryogenic fluid, comprising at least one fluid supply device for supplying pressurized cryogenic fluid comprising a thermally insulated container consisting of an inner tank delimiting a volume designed to store cryogenic liquid to be pumped and an outer tank arranged about the inner tank and delimiting a sealed volume about the inner tank, wherein when the device is in the usage state, the inner tank and the outer tank extend vertically and are closed at the top end thereof by a set of covers, a pumping system mounted on the set of covers and comprising a lower end seated in the volume delimited by h oner tank and designed to pump the cryogenic liquid therein, a cryogenic liquid feed circuit designed to supply the inner tank with cryogenic fluid and a delivery circuit designed to transfer the cryogenic liquid pumped by the pumping system out of the inner tank, wherein the pumping system comprises two piston pumps actuated by an actuator the two piston pumps being connected in parallel to the delivery circuit and designed to be actuated in an offset manner to ensure a continuous flow of cryogenic liquid pumped through the delivery circuit wherein two alternating pumps are used in parallel and form a single compression stage delivering a continuous flow at constant pressure, wherein the cryogenic liquid feed circuit is configured to be connected to at least one source of liquefied cryogenic fluid, the installation comprising at least one pressurized cryogenic fluid distributor provided with a transfer line having one end designed to be connected to a tank to be filled, the installation comprising a distribution circuit connecting the delivery circuit of at least one fluid supply device to at least one fluid distributor.

2. The installation according to claim 1, further comprising several fluid supply devices connected in parallel to one or more fluid distributors via the distribution circuit, the distribution circuit comprising a common distribution line and a set of distribution valves designed to enable the selective transfer of fluid from one or more fluid supply devices to the fluid distributor or distributors.

3. The installation according to claim 1, further comprising at least one source of cryogenic liquid connected to the cryogenic liquid feed circuit of at least one fluid supply device.

4. The installation according to claim 3, wherein the fluid distributor comprises a pressurized gas recovery circuit connected to the transfer line and a gas recovery member, for example the source of cryogenic liquid.

5. The installation according to claim 4, wherein the fluid distributor comprises a gas recovery circuit having one end connected to the transfer line and one end connected to a gas recovery member, for example the source of cryogenic liquid and/or connected to the flue.

6. The installation according to claim 1, further comprising a reserve of flushing gas and a purge network connecting the reserve of flushing gas to the transfer line of the fluid distributor and to the supply device or devices.

7. The installation according to claim 1, wherein the set of covers comprises a first cover and a second cover, the second cover closing an opening in the first cover, the second cover forming a support for the pumping system and being mounted sealingly and removably on the second cover, the pumping system being designed to be mounted or removed vertically in relation to the container when the second cover is mounted or removed.

8. The installation according to claim 1, wherein the delivery circuit comprises a delivery line having a lower end connected to the lower end of the pumping system and an upper end connected to the set of covers, when the device is in the usage state, a part of the delivery line being immersed in the cryogenic liquid to be pumped.

9. The installation according to claim 8, wherein the upper end of the delivery line is connected to the second cover and opens in the latter.

10. The installation according to claim 1, wherein the cryogenic liquid feed circuit comprises a set of valves and passes through the sealed volume delimited about the inner tank by the outer tank.

11. The installation according to claim 1, wherein the set of covers comprises at least one degassing outlet passage connected to a set of degassing lines passing through the sealed volume delimited about the inner tank by the outer tank.

12. The installation according to claim 11, wherein the set of degassing lines comprises a first degassing line having a first end connected to an upper end of the inner tank and a second end leading to a coupling outside the container.

13. The installation according to claim 11, wherein the first degassing line comprises a valve.

14. The installation according to claim 11, wherein the set of degassing lines comprises at least one second degassing line having a first end connected to the first degassing line and a second end leading to a coupling or passage outside the container.

15. The installation according to claim 14, wherein the set of degassing lines includes at least one second degassing line provided with a valve and/or connected to a pressure-sensitive safety valve located outside the container.

16. The installation according to claim 1, wherein the pumping system comprises a piston rod that extends vertically in the inner tank, the device comprising a support and guidance structure for the pumping system mounted about the piston rod inside the inner tank, the device further comprising a thermal insulation structure interposed about the support and guidance structure.

17. The installation according to claim 16, wherein the thermal insulation structure is rigidly connected to the second cover between the second cover and a lower end of the support and guidance structure.

18. The installation according to claim 16, wherein the thermal insulation structure comprises a vertical stack of a set of insulating foam layers and/or a set of thermal shields.

19. The installation according to claim 1, wherein the device comprises a purge circuit comprising at least one line having a first end leading to a coupling or passage outside the container and a second end connected to the feed circuit.

* * * * *